US006518554B1

(12) United States Patent
Zhang (10) Patent No.: US 6,518,554 B1
(45) Date of Patent: Feb. 11, 2003

(54) REVERSE FOCUSING METHODS AND SYSTEMS

(75) Inventor: Hai Zhang, Mission Viejo, CA (US)

(73) Assignee: ChromaVision Medical Systems, Inc., San Juan Capistrano, CA (US)

( * ) Notice: Subject to any disclaimer, the term of this patent is extended or adjusted under 35 U.S.C. 154(b) by 0 days.

(21) Appl. No.: 09/578,350

(22) Filed: May 24, 2000

(51) Int. Cl.[7] .............................................. G02B 26/00
(52) U.S. Cl. .................................. 250/201.3; 250/201.2
(58) Field of Search ........................... 250/201.3, 201.2, 250/201.4, 201.8

(56) References Cited

U.S. PATENT DOCUMENTS

| 4,342,905 | A | * | 8/1982 | Fuji et al. ..................... 250/201 |
| 4,945,220 | A | * | 7/1990 | Mallory et al. ........... 250/201.3 |
| 5,003,165 | A | * | 3/1991 | Sarfati et al. ............. 250/201.2 |
| 5,338,924 | A | * | 8/1994 | Barrett et al. ............. 250/201.4 |
| 5,647,025 | A | * | 7/1997 | Frost et al. ............... 250/201.3 |
| 6,072,570 | A | | 6/2000 | Chipman et al. |
| 6,236,031 | B1 | * | 5/2001 | Ueda ......................... 250/201.5 |
| 6,313,452 | B1 | * | 11/2001 | Paragano et al. ......... 250/201.3 |

FOREIGN PATENT DOCUMENTS

| DE | 3340647 | 5/1985 |
| WO | WO 97/20198 | 6/1997 |

OTHER PUBLICATIONS

McKeough et al., "A Low–Cost Automatic Translation and Autofocusing System for a Microscope", *Measurement Science and Technology, IOP Publishing, Bristol, GB*, vol. 6, No. 5, May 1, 1995 (pp. 583–587).

Roca et al., "New Autofocusing Algorithm for Cytological Tissue in a Microscopy Environment", *Optical Engineering, Soc. of Photo–Optical Instrumentation Engineers, Bellingham, US*, vol. 37, No. 2, Feb. 1, 1998, pp. 635–641.

* cited by examiner

Primary Examiner—Robert H. Kim
Assistant Examiner—Hoon K. Song
(74) Attorney, Agent, or Firm—Fish & Richardson P.C.

(57) ABSTRACT

The invention relates to reverse focusing and methods and systems which employ reverse focusing. In a particular example, an automated focusing microscope uses one or more reverse focusing steps to acquire a focused image. Computer programs having instructions for instructing a computer to acquire a focused image by reverse focusing are also included.

38 Claims, 4 Drawing Sheets

REVERSE FOCUSING METHODS AND SYSTEMS

TECHNICAL FIELD

This invention relates to focusing of samples, and more particularly to an automatic reverse focusing system for microscopic imaging instruments.

BACKGROUND

The diagnosis of physiological conditions such as cancer, infectious disease and prenatal disorders, is of paramount importance to the prevention, monitoring and treatment of such diseases. Typically, a biological specimen from a patient is used for analysis; identifying the presence of particular characteristic features of the disease indicates the presence or predisposition towards the disease. Biological sample analysis in its most traditional sense is performed by microscopic examination which, depending on the magnification, can be used to visualize the presence of abnormal numbers or types (e.g., cytology) of cells, organelles, organisms or biological markers.

Automated microscopic analysis systems have been developed to analyze specimens quickly and have the advantage of accuracy over manual analysis in which technicians may experience fatigue over time leading to inaccurate reading of the sample (see, e.g., the ACIS system, Chromavision, San Juan Capistrano, Calif.). Typically, samples on a slide are loaded onto the microscope, the microscope objective or lens focuses on a particular area of the sample, and the sample is scanned for particular features or objects of interest. To achieve an accurate image of the sample or particular features or objects in the sample, the sample must be focused. However, for various reasons present focusing methods and systems often have difficulty or require extended amounts of time to attain an optimal image focus. Improvement in image quality and the speed with which images are focused in microscopic systems will lead to improvements in sensitivity, speed, and accuracy of sample analysis and the diagnosis of disease by such systems. The invention mitigates this problem and provides related advantages.

SUMMARY

Figure 1:
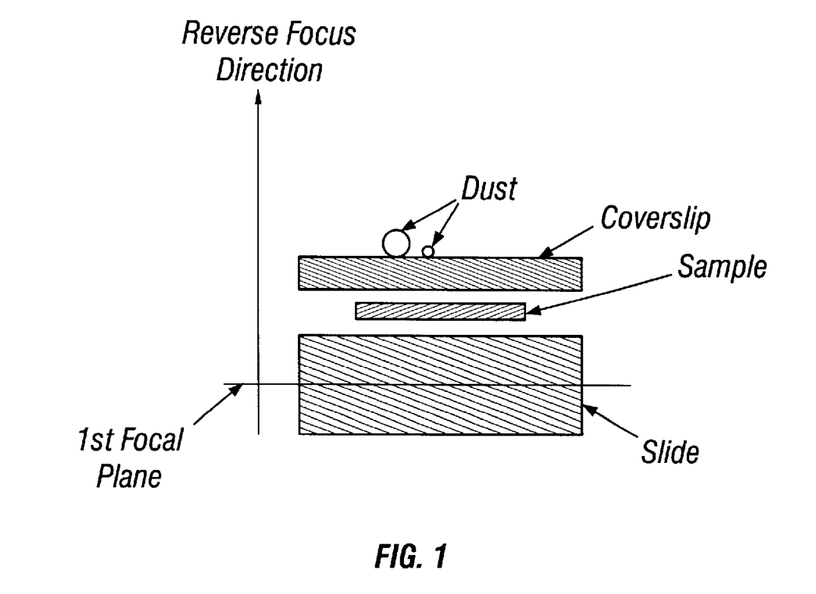
FIG. 1 shows an exemplary location of a first focal plane and the reverse focus direction along the z-axis after acquiring a first image.

One of the problems of current automated focusing systems is obtaining focused images. For automated focusing microscope systems, difficulties can be due to the presence of dust or dirt on the slide or coverslip, or the presence of imperfections or flaws, one or more of which can lead to an inability or a delay in obtaining a focused image. As shown in FIG. 1, dust particles may appear on top of the coverslip. As the objective travels from the top to the bottom, it may focus on the dust particles if the dust particles generate a strong signal of focus power. Although the sensitivity of the focus algorithm can be decreased in order not to focus on the dust, the disadvantage is that the focus algorithm may not be able to focus on the sample when the sample gives a weak focus power signal due, for example, to a light stain. The invention addresses such problems through the technique of reverse focusing. In this technique, the focus or focal plane of a lens, such as an objective of a microscope, is set so that the focal plane is located below a sample of which an image is to be acquired. After the focal plane is set to the desired position, an image is acquired at that position. After acquiring the first image, one or more subsequent images (second, third, fourth, fifth, etc.) are acquired after adjusting the position of the focal plane along the z-axis away from the first image focal plane, i.e., reverse focusing. In this way, the sample can be the first thing to be seen because when the stage or objective moves up, focusing on dust can be avoided. Thus, the focus algorithm can be set at a sensitivity to focus on samples that generate weak focus power signals.

The position of the focal plane can be set based upon knowledge of the positions of the objective or lens, the stage or other similar substrate supporting or positioning device, the thickness of the substrate (e.g., microscope slide) upon which a sample has been placed, and a coverslip, if used. In this way, the focal plane of an autofocusing system can be positioned at any location relative to the slide (top or bottom), sample, coverslip (top or bottom), or stage. For example, where a sample is placed on a slide in a microscope field of view, by knowing the slide thickness and distance of the slide relative to the objective, the focal plane can be set below or within the slide or sample. After acquiring a first image at the particular position, the focal plane is moved along the z-axis (i.e., reverse focused) away from the slide, and a second image is acquired at a z-position located above the focal plane at which the first image was acquired. Subsequent images can then be acquired by additional reverse focusing steps, or through one or more forward focusing steps (i.e., moving towards the position of the focal plane at which the first image was acquired). Accordingly, by setting the focal plane for the first image from within or below the slide and acquiring a first image, and reverse focusing to acquire a second image, focusing problems associated with dirt or dust on the top surface of a coverslip, for example, which typifies automated focusing systems, can be minimized or avoided.

The details of one or more embodiments of the invention are set forth in the accompanying drawings and the description below. Other features, objects, and advantages of the invention will be apparent from the description and drawings, and from the claims.

DETAILED DESCRIPTION

The invention is based on the finding that a focused image can be obtained by setting the focal plane of a microscope below or within a sample being examined, acquiring an image at the position, moving the focal (focusing) plane upwards along the z-axis and acquiring a second image. The technique, referred to as "reverse focusing," acquires a first image within a sample being imaged, or at some point below the sample (e.g., within a slide upon which the sample has been placed). A second image is acquired after moving the focal plane of the optical system (e.g., objective) up along the z-axis away from the position of the focal plane at which the first image was acquired. A plurality of images along the z-axis can be acquired such that images are acquired in a reverse direction, for example. Peak focus power corresponds to the focused image and image focus power is determined for each image thereby identifying peak focus power for the sample. Thus, after acquiring a sufficient number of images, the peak focus power of the sample can be identified thereby obtaining a focused image of the sample.

In accordance with the invention, there are provided methods, systems, and computer programs for focusing of an image of a sample. A method of the invention includes positioning a sample on a substrate in a microscope field of view; acquiring a plurality of images, wherein a first image is acquired after setting the focal plane within or below the sample and a second image is acquired after moving the focal plane upwards along the z-axis away from the sample; processing the images in order to identify a peak focus power of each image; and selecting the peak focus power to obtain a focused image. In one embodiment, the first image is acquired at a predetermined focal depth.

As used herein, the term "sample" means an object that is being viewed. Any sample that can be viewed by a microscope is included within the meaning of the term. In one embodiment, the sample comprises a biological specimen. Particular biological specimens include fluids (e.g., amniotic, blood, cerebrospinal, urine, mucus, semen), cells, tissue sections, scrapings or biopsy (e.g., solid tumor), hair, nails, etc. Samples can be modified, e.g., cryopreserved, stained, counterstained, embedded in paraffin, etc., to aid in preserving or visualizing the sample or objects of interest therein.

As used herein, the term "microscope field of view" means that the sample is positioned relative to a microscope lens or objective so as to be viewable through the lens or objective. Typically, the sample will be positioned below the lens or objective as in a microscope configuration. However, the sample can be in any position relative to an objective or lens so long as it is within a microscope field of view. A sample in a microscope field of view can be separated from the optical system of the microscope by any distance. Additional elements can be interposed between the field of view and the sample (e.g., prisms, filters, amplifiers, processors, detectors, mirrors, light sources, etc.), so long as the sample is viewable.

Microscopes typically have one or more objectives and, where samples or components within the sample (e.g., organelles within a cell) are not visible to the naked eye, one or more of the objectives can be capable of magnifying the sample. Typical magnifications range from 2X up to 1000X, but the use or amount of magnification is not to be construed in as limiting the invention.

To obtain a focused image of a sample, microscopes have a stage for moving the objective or sample along the z-axis, thereby moving the focal plane of the objective towards the sample; generally, either the objective or sample is in a fixed position and the other is moved along the z-axis. A position along the z-axis will provide a focal plane in which optimal focus of an image of the sample or a portion thereof by the objective is obtained. In a method of the invention, a first image is acquired at a position along the z-axis ("z-position") and a second image thereafter is acquired after moving the focal plane upwards along the z-axis away from the position of the focal plane at which the first image was acquired.

Figure 2:
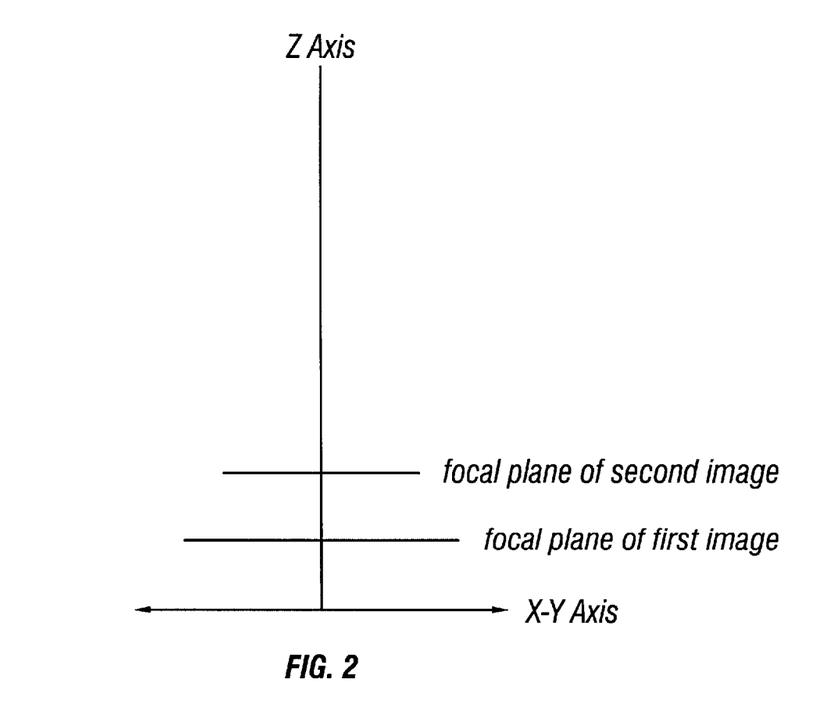
FIG. 2 shows the relationship of the z-axis to the x-y plane and relative positions of first and second image focal planes along the z-axis.

The z-axis is the axis perpendicular to a two-dimensional x-y plane, as is understood in the art. Thus, where a sample is in an x-y plane, such as on a generally planar slide, the z axis is perpendicular to the slide extending from above and below the slide. A z-position is a position along the z-axis (e.g., position of focal plane, best focus, objective, stage, sample, slide, etc.). The relationship between the z-axis and x-y plane is shown in FIG. 2.

As used herein, the term "reverse," when used in reference to focus or focusing, or any of the steps associated therewith (e.g., moving the focal plane, stage, objective, sample, slide, etc.), means movement of an objective along the z-axis in a direction upwards or away from an x-y plane (e.g., a microscope slide). For example, reverse focusing of a slide on a stage would increase the distance between the stage and the objective. Thus, where a sample is on a substrate along an x-y plane and an objective for viewing the sample is positioned above the slide, as in a typical microscope arrangement, "reverse focusing" means that a second image, or an image thereafter, is acquired after moving the focal plane along the z-axis away from the slide. "Forward focusing" is the opposite of reverse focusing, i.e., movement of the objective along the z-axis, towards an x-y plane (e.g., a microscope the slide in the above example). It is understood that the number of images, acquired after the first and second images, denoted "third," "fourth," "fifth," "sixth," etc., can be acquired after forward or reverse focusing relative to the positions of the focal plane at which the first image was acquired.

A substrate used in microscope systems is generally a planar piece of material, such as glass, plastic or other solid matrix used for mounting and visually examining a sample with a microscope. A substrate that is substantially light transparent can be a slide, or any other comparable light transmittable medium for viewing a sample. A "coverslip" is defined broadly herein to include any suitably light transmittable material useful in securing a sample to a slide. Substrates and coverslips can have various geometric configurations and dimensions (e.g., rectangular, square, triangular, circular), size, thickness, and light transmittance. Substrates and coverslips can, if desired, be modified, for example, to increase light transmittance, sample stability, focusing or image detection, etc. Substrates and coverslips can be marked for sample identification or classification purposes, for example, using a bar code, microchip, indelible ink, etc.

In a method of the invention, a second image is acquired after reverse focusing along the z-axis away from the position of the focal plane at which the first image was acquired. Where there are, e.g., third, fourth, fifth, or subsequent images acquired, these images can be acquired either by reverse or forward focusing. For example, after acquiring a second image after reverse focusing, one or more subsequent images can be acquired by forward focusing. Thus, in the methods, systems and programs of the invention, it is intended that any image acquired after the second image can be acquired by moving the focal plane along the z-axis in either direction (i.e., reverse or forward focusing). For example, a third image can be acquired after forward focusing, a fourth image can be acquired after reverse focusing, fifth and sixth images can be acquired after forward focusing, and seventh through ninth images can be acquired after reverse focusing. Typically, all or a majority of images acquired after the second image are acquired after reverse focusing.

Thus, in one embodiment, at least one image is acquired after a first and second image by adjusting the focal plane downwards along the z-axis, i.e., forward focusing. In one aspect, the third image is acquired after adjusting the focal plane downwards along the z-axis. In additional aspects, images acquired after the second image are acquired after reverse focusing, forward focusing, or a combination thereof.

In the invention, a first image is acquired by setting a focal plane at a particular location. The location can be at any z-position so long as the second image is acquired after reverse focusing. For example, the focal plane can be set along the z-axis so that the first image acquired is of the sample, below the sample, proximal to the top surface of the slide, within the slide, or below the slide. The focal plane can then be reversed along the z-axis to a different position, in a fine or coarse iteration, to acquire a second image. Images acquired after the second image can be acquired after adjusting the focal plane upwards or downwards along the z-axis, reverse, or forward focusing, respectively.

Typically, each image is acquired after movement of the objective or sample along the z-axis has stopped. It is possible however to acquire images while simultaneously moving the sample or objective along the z-axis so long as the movement is slow enough to avoid blurring of the images. The speed of movement allowed while simultaneously acquiring unblurred images will depend on the shutter speed of the camera used to acquire the image and the image magnification. Faster shutter speeds allow faster movement along the z-axis without blurring images, whereas greater magnification of the sample requires slower movement. The skilled artisan, taking shutter speed and magnification into account, can readily ascertain the speed of sample or objective movement along the z-axis that allows simultaneous acquisition of unblurred images.

At any point before, during, or after image acquisition, it is possible to increase or decrease the magnification of the sample (e.g., by switching to a higher or lower power objective). For example, after acquiring one or more images at 10X magnification, it may be desired to acquire one or more additional images at a different magnification, such as 40X, 100X, etc. This may allow fine-tuning or greater precision in identifying a peak of image power.

Thus, in accordance with the invention, also provided are methods, systems, and computer programs for focusing of an image of a sample on a slide. In one embodiment, a coverslip is placed on top of the sample on the slide. In one aspect, the first image is acquired below the bottom surface of the coverslip. In another aspect, the first image is acquired between the top surface of the slide and the bottom surface of the coverslip. In yet another aspect, the first image is acquired proximal to the top surface of the slide. In various additional aspects, the first image is acquired at a predetermined position, for example, above the top surface of the slide, below the bottom surface of the coverslip, between the top surface of the slide and the bottom surface of the coverslip, or at any point within the sample. The images may be in color, black and white, or a combination thereof. The images may be digitized or in analog form.

In order to assess focus quality of a particular image, an image processor will be used. The image processor quantifies image focus power so that an image with a peak of focus power can be identified. A particular way in which an image processor determines focus power is by calculating the amount of pixel variance occurring within a particular image or at the edge of the image. Pixel variance is the difference in intensity of a pixel in comparison to a nearby or adjacent pixel(s). An image having the greatest pixel variance will have greatest focus power, which corresponds to an image with an optimal focus, whereas image(s) having comparably lower pixel variance have lower focus power and are less focused. Thus, mathematical algorithms that calculate focus power based on pixel variance of an image can be employed in the methods, systems, and computer programs of the invention.

The algorithms used by the processor to quantify focus power can be set so as to reject low levels of noise created by the imaging instrument (e.g., microscope), or be set to reject high signals caused by defects or flaws in the slide, coverslip, mounting medium, optics, dust particles, irregular staining, etc. The algorithms can further be adapted or modified to select and quantify focus power for particular features, structures, or other objects of interest of the sample or image. Typically, after calculating image focus power, the processor will send the information to a computer which scores each value. After a plurality of images are acquired, the computer will determine which image or images have a maximum of focus power (e.g., an image with the greatest pixel variance), thereby identifying the optimal or best focus of the image.

Thus, in another embodiment, the invention provides methods, systems, and computer programs for processing of an image in which peak image power is determined by a focus algorithm. In one embodiment, the focus algorithm comprises a regular focus algorithm. In another embodiment, the focus algorithm comprises a Focus-With-Force algorithm. In yet another embodiment, the focus algorithm can be set so that a peak of focus power is above or below a predetermined threshold. In still another embodiment, a peak of focus power is within a set range.

A regular focus algorithm typically determines optimal focus by identifying a qualified peak of the focus power curve. When an objective travels along the z-axis, a series of images are acquired. A focus power is calculated for each image acquired. By plotting the focus power of each image versus the z-position of the corresponding image, a focus power curve is created. If a qualified peak of focus power is found, the objective will stop searching, and the algorithm gives the z-position of the peak which corresponds to the best-focused image. A qualified peak is defined as: (1) the peak greater than a pre-defined threshold, (2) the peak has to be sharp enough. Satisfying these two conditions will avoid false peaks generated by noise and small dust particles.

Factors affecting the ability of the focus algorithm to identify the peak include, for example, a sample that has low density or lightly stained, in which case the algorithm can't find a qualified peak of focus power or if there are large dust particles on the coverslip, the objective may focus on the dust because a dust particle may have a large peak of focus power greater than that of the sample. In this case, the focus algorithm will stop searching after it finds the dust particles, and assume this z-position is the sample focus. As the reverse focusing methods of the invention generally minimize or avoid problems associated with dust, regular focus algorithms can be employed in the methods, systems, and computer programs of the invention.

Additional focus algorithms that can be used to calculate focus power in order to identify a peak of focus power include Focus-With-Force. The Focus-With-Force algorithm is designed to focus on a sample that has light stain and there is no dust or very few small dust particles on the cover slip. The algorithm assumes that the sample has a peak of focus power, and this peak is the largest peak in the searching range.

If the first image is acquired below the bottom of the slide, and there is a possibility of dust being present on the bottom of the slide, a Knowledge-Based focus algorithm can be used. Knowledge-Based focus algorithm has been developed in order for forward focusing to work when dust or other flaws that give false peaks of focus power are present on the coverslip. Thus, in the case of reverse focusing, such an algorithm may be used in a situation where the first image is acquired below the bottom of the slide. A user can input parameters to the focus algorithm, which tell the estimated distance between the dust particles and the sample. The focus algorithm identifies the largest peak generated by the dust particles, then moves the z stage along the z-axis to a certain distance where the sample is predicted to be peak. The second peak at $z=2270$ micron is associated with the samples, referred to as a samples peak. The Knowledge-Based focus algorithm will first find the dust peak which is a global maximum. Based on the knowledge provided by a user that the samples is approximately 90 microns away from the dust, the algorithm will look for a local maximum in the z range around the sample, for example from 2240 micron to 2380 micron. It will give the $z=2270$ micron as the focus position for samples. Similarly, for reverse focusing, if the first image is taken when the focal plane is set below the bottom surface of the slide, and the subsequent image(s) are taken while the z stage is moved upwards, the algorithm may find a dust peak associated with dust on the bottom surface of the slide. Based on knowledge of the distance between the sample and the dust on the bottom surface of the slide, the algorithm will look for a local maximum in the z range around the samples.

In general, the number of images acquired after the second image is acquired will be sufficient to locate the peak image power. Any number of images of a sample, in forward or reverse sequence, at any z-position or x-y position, can be acquired in order to obtain a focused image and, therefore, any number of reverse or forward focusing steps along the z-axis can occur. For example, if after a series of reverse focusing steps an image was acquired with decreased pixel variance in comparison to a previous image acquired (e.g., the focusing step "overshot" the peak focus), it is possible to acquire the next image after forward focusing towards the focal plane at which the reverse focused image having the decreased pixel variance was acquired.

If desired, the number of images acquired can be preset. For example, a predetermined number of images can be acquired that is expected or predicted to be sufficient to detect peak image power. The sequence of forward and reverse focusing steps also can be preset, for example, there may be ten reverse focusing steps after acquiring the first image, and then two forward focusing steps thereafter. The z-position at which any of the images are acquired can also be preset, in coarse or fine iterations, if desired. For example, a z-position for a focal plane of a first image can be located between the bottom surface of a coverslip and the top surface of a slide. Second (reverse) and subsequent images (reverse or forward) can be acquired by coarse iterations between focal planes, and fine iterations between focal planes (reverse or forward) can then be used to obtain optimal image focus of the sample. The number of images, sequence of forward and reverse focusing steps, and the z-position of each image acquired can be determined by the skilled artisan, depending on the type of sample to be focused and the type of analysis being performed. Computer programs including such focusing schemes are specifically contemplated, and such programs are applicable to the invention methods and systems.

The type of microscope or image viewing system in which the methods, systems, and computer programs of the invention can be employed or adapted for use is not to be construed as limiting the invention, so long as the microscope or other image viewing system is capable of reverse focusing, i.e., after acquiring a first image at a particular focal plane, the second image is acquired after moving the focal plane along the z-axis away from the position at which the first image was acquired. Thus, any of a number of sample viewing apparatus (automated or manual), and automated focus systems and methods can be adapted for use with the methods, systems, and computer programs of the invention.

Figure 3A:
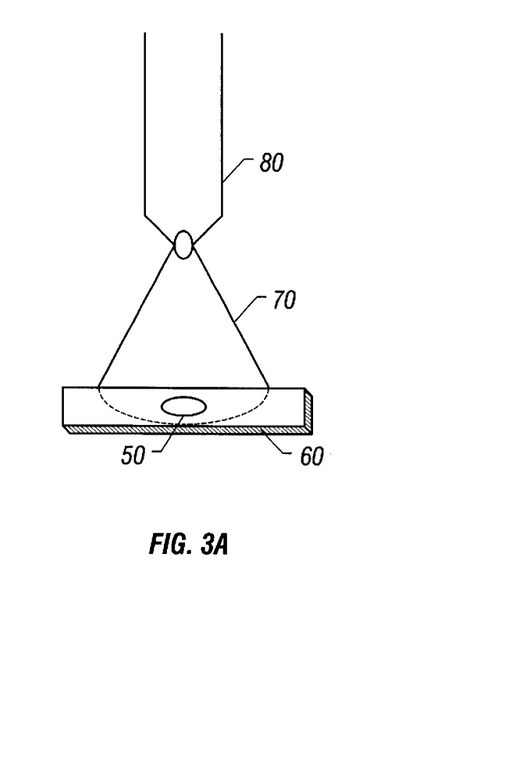
FIGS. 3A and 3B is a diagram of several components of a microscope focusing system.
Figure 3B:
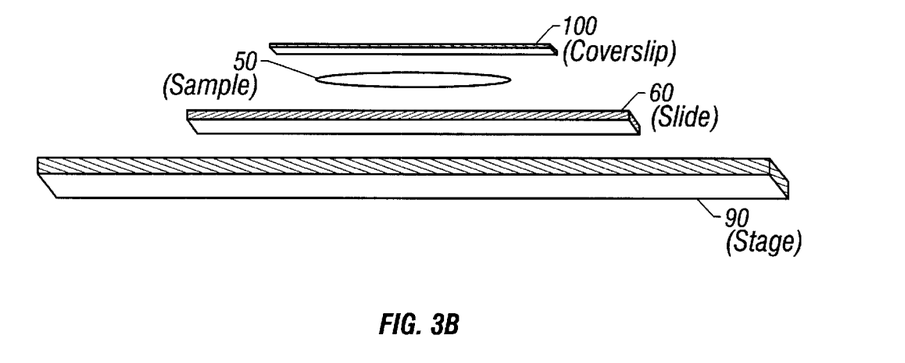

Referring now to the figures, FIG. 1 illustrates the direction of reverse focusing along the z-axis relative to a sample on a slide. FIG. 2 illustrates the z-axis and x-y plane and the relative z-position of first and second focus planes used for acquiring first and second images. FIG. 3A illustrates a sample (50) on a slide (60) in a microscope field of a view (70) of an objective (80) for viewing samples, generally indicated by reference numeral 10 as shown in perspective view. FIG. 3B illustrates the stage (90) upon which the sample (50) on a slide (60) can be placed. The slide additionally can include a coverslip (100), which is placed over all or a portion of the sample (50). The stage (90) or the objective (80) are moved relative to each other in order to adjust the position of the focal plane along the z-axis. In this example, the light microscope has a movable stage for moving the objective either forward or reverse along the z-axis and the sample is in a fixed position. In an alternative embodiment, the sample is movable along the z-axis and the objectives position is fixed.

The sample or an area of interest of the sample on the slide is selected, and a motor controller attached to the objective moves the objective into an appropriate z-position, after which an image is acquired. A first image is acquired at a particular focal plane, for example, by adjusting the objective so that its focal plane is between the top surface of the slide and the bottom surface of the coverslip or between the top surface of the slide and bottom surface of the slide. The image is processed to calculate image power. In one embodiment, the objective is then moved upwards along the z-axis and away from the slide so that the focal plane is at a z-position above the focal plane at which the first image was acquired. The image at this reverse focused position is acquired and processed to calculate an image focus power. The steps of reverse or forward focusing and acquiring an image and calculating image focus power are repeated until a peak image power is identified in the sample. Through this automated focusing process, the optimal focus of an image is obtained.

Figure 4:
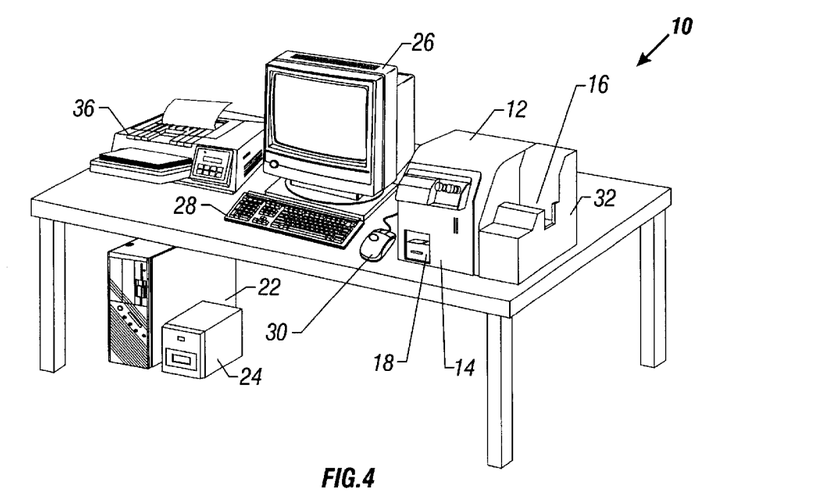
FIG. 4 is a diagram of an exemplary system for automated focusing of a sample on a slide including a microscope, a computer, and a computer program.
Figure 5:
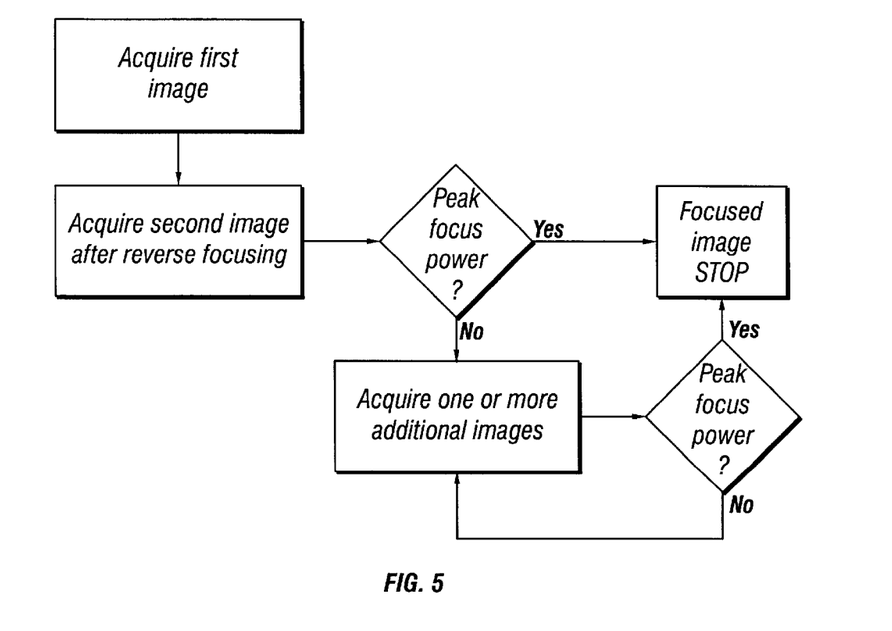
FIG. 5 is a flowchart showing the sequence of acquiring a plurality of images and for obtaining a focused image.
Figure 6:
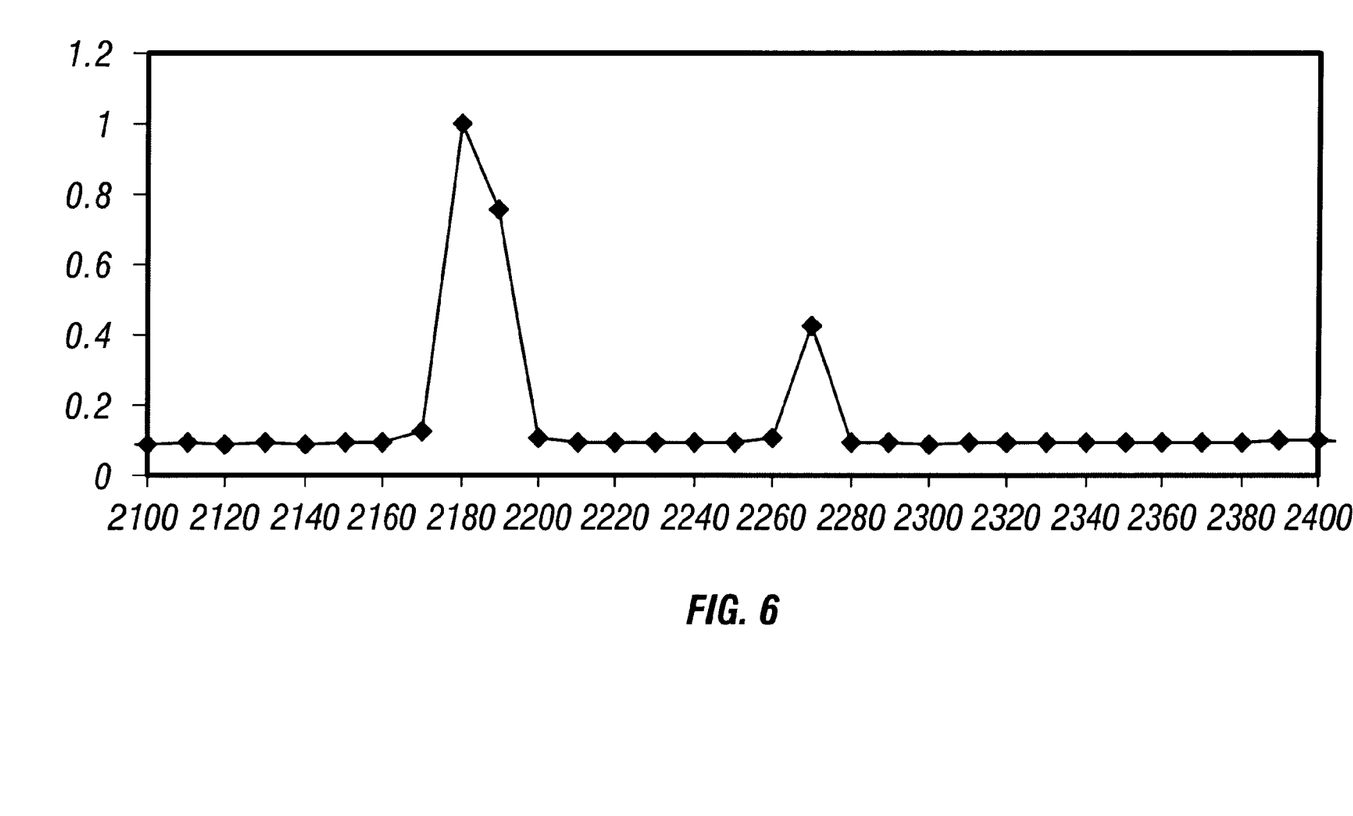
FIG. 6 is an illustration showing how the Knowledge-Based algorithm works for forward focusing.

Another example of a microscope system which can be adapted for use with the methods and systems of the invention is the optical system shown in FIG. 4. The apparatus (10) comprises a microscope subsystem (32) housed in a housing (12). The housing (12) includes a slide carrier input hopper (16) and a slide carrier output hopper (18). A door (14) in the housing (12) secures the microscope subsystem from the external environment. A computer subsystem comprises a computer (22) having at least one system processor. The computer subsystem further includes a computer monitor (26) and other external peripherals, including a storage device (e.g., removable hard drive, DAT tape, local hard drive, optical disk, etc.), a pointing device, such as a track ball device (30), a user input device, such as a touch screen, keyboard, or voice recognition unit (28), and printer (36). An optional external power supply (24) is also shown for power outage protection. The apparatus (10) further includes an optical sensing array, such as a camera, preferably a CCD camera, for acquiring images. Microscope functions are under the control of system processor through the use of computer instructions for instructing a number of microscope-subsystem functions, e.g., automated slide scanning and focusing, movement of the stage or objective along the x-y plane or z-axis, illumination intensity, slide handling in the apparatus (10), motorized objective turret movement for selection of objectives, etc.

Additional focusing systems, apparatus, and methods which are adaptable for use with the methods, systems, and computer programs of the invention are found, for example, in application Ser. Nos. 08/287,268 and 08/758,436; U.S. Pat. Nos. 5,647,025 and 4,012,634.

Optical systems other than microscopes may be used in connection with the invention. Again, all that is required is the capability of one or more reverse focusing steps so as to acquire a focused image. Thus, any optical system useful for viewing a sample in which focusing of the image can improve the visualization or resolution of the sample, a component of the sample, or a portion of the sample can be modified to include the methods, systems, or computer programs of the invention.

Instructions for carrying out the invention methods can be put into computer readable code. Thus, in accordance with the invention, there are provided computer programs, including instructions for causing a computer system to acquire a plurality of images of a sample. In one embodiment, a program includes instructions for acquiring a first image by setting a focal plane at a z-position and for acquiring a second image after moving the focal plane upwards along a z-axis. In another embodiment, a program includes instructions for processing the images in order to identify a peak focus power of each image. In still another embodiment, a program includes instructions for selecting peak focus power. In additional embodiments, a program includes instructions for setting the focal plane along the z-axis at one or more positions. In yet other embodiments, the program includes instructions for acquiring a plurality of images at focal planes after a plurality of forward and reverse focusing steps. Additional embodiments include instructions for moving the x-y plane or objective along the x-y plane.

In another embodiment, the program includes instructions for one or more optical characteristics of a biological sample. As used herein, the phrase "optical characteristics of a biological sample," when used in reference to a computer program, means information in the program that accounts for visual features or characteristics of a particular biological sample (such as color, sample thickness, density, etc.). Such features, when accounted for by the program, may allow for focusing in particular color hue ranges (i.e., red instead of blue), or adjust for differences in sample density, light transmittance etc., to improve focusing.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described herein.

All publications, patents, other references, GenBank citations, and ATCC citations mentioned herein are incorporated by reference in their entirety. In case of conflict, the present specification, including definitions, will control.

A number of embodiments of the invention have been described. Nevertheless, it is understood that various modifications may be made without departing from the spirit and scope of the invention. Accordingly, other embodiments are within the scope of the following claims.

What is claimed is:

1. A method for automatic focusing of an image of a sample comprising:
    (a) positioning the focal plane of an objective between the bottom surface of a substrate and the top surface of the substrate and acquiring a first image in a microscope field of view;
    (b) reverse focusing along a z-axis away from the first focal plane;
    (c) acquiring a plurality of images along the z-axis;
    (d) processing the images in order to identify a peak focus power of each image; and
    (e) selecting the peak focus power to obtain a focused image of a sample positioned on the surface of the substrate.

2. The method of claim 1, wherein the substrate comprises a slide.

3. The method of claim 1, wherein the substrate is transmittable to visible light.

4. The method of claim 1, wherein a coverslip is placed on top of all or part of the sample.

5. The method of claim 1, wherein the focal plane of the first image is set near the top surface of the substrate.

6. The method of claim 1, wherein the focal plane of the first image is set at a predetermined position within the substrate.

7. The method of claim 1, wherein step (c) further comprises acquiring a third or subsequent image by moving the focal plane downwards along the z-axis.

8. The method of claim 1, wherein the sample comprises a biological sample.

9. The method of claim 1, wherein the peak focus power is determined by a focus algorithm.

10. The method of claim 9, wherein the focus algorithm calculates pixel variance.

11. The method of claim 9, wherein the focus algorithm comprises Focus-With-Force.

12. The method of claim 1, wherein the peak focus power is above a predetermined threshold.

13. The method of claim 1, wherein the peak focus power is below a predetermined threshold.

14. The method of claim 1, wherein the peak focus power is within a set range.

15. A system for automatic focusing of an image on a substrate comprising:
    (a) a microscope for viewing a sample positioned on the surface of the substrate;
    (b) a computer; and
    (c) a computer program stored on a computer-readable medium, the program comprising instructions for causing a computer system to acquire a plurality of images, wherein a first image is acquired by positioning the focal plane of an objective between the bottom surface of the substrate and the top surface of the substrate, and subsequent images are acquired by reverse focusing along a z-axis away from the first focal point.

16. The system of claim 15, wherein the system is calibrated to position the focal plane for acquiring the first image between the bottom surface of the substrate the top surface of the substrate.

17. The system of claim 15, wherein the system is calibrated to position the focal planes for acquiring subsequent images between the top surface of the substrate and the bottom surface of the coverslip.

18. The system of claim 15, wherein the system is calibrated to position the focal planes for acquiring the plurality of images between the top surface of the substrate and the bottom surface of the coverslip.

19. The system of claim 16, wherein the calibration is determined by substrate thickness.

20. A computer program for automatic focusing of a sample in a microscope field of view, stored on a computer-readable medium, the computer program comprising instructions for causing a computer system to:

acquire a plurality of images, wherein the first image is acquired by setting a focal plane at a z-position, and a second image is acquired after reverse focusing the focal plane upwards along a z-axis.

21. The system or program of claims 15 or 20, wherein the program further comprises instructions for processing the images in order to identify a peak focus power of each image.

22. The system or program of claim 15 or 20, wherein the program further comprises instructions for selecting peak focus power to obtain a focused image.

23. The program of claim 20, wherein the program further comprises instructions for acquiring the first image between the top surface of the substrate and the bottom surface of the coverslip.

24. The program of claim 20, wherein the program further comprises instructions for acquiring the first image proximal to the top surface of the substrate.

25. The program of claim 20, wherein the program further comprises instructions for acquiring the first image at a predetermined position.

26. The program of claim 20, wherein the program further comprises instructions for locating the predetermined position below the top surface of the substrate.

27. The program of claim 20, wherein the program further comprises instructions for acquiring the first image between the top surface and bottom surface of the substrate.

28. The program of claim 20, wherein the program further comprises instructions for locating the predetermined position below the bottom surface of the substrate.

29. The program of claim 20, wherein the program further comprises instructions for locating the predetermined position between the top surface and bottom surface of the substrate.

30. The program of claim 20, wherein the program further comprises instructions for processing the images in order to identify a peak focus power of a third or subsequent image by adjusting the focal plane downwards along the z-axis.

31. The program of claim 20, wherein the program further comprises instructions for one or more optical characteristics of a biological sample.

32. The program of claim 20, wherein the program further comprises instructions for determining a peak focus power by a focus algorithm.

33. The program of claim 20, wherein the program further comprises instructions for determining focus power by a focus algorithm that calculates pixel variance.

34. The program of claim 20, wherein the program further comprises instructions for determining a peak focus power by a focus algorithm, wherein the focus algorithm comprises Focus-With-Force.

35. The program of claim 20, wherein the program further comprises instructions for determining when a peak focus power is above a predetermined threshold.

36. The program of claim 20, wherein the program further comprises instructions for determining when a peak focus power is below a predetermined threshold.

37. The program of claim 20, wherein the program further comprises instructions for determining when a peak focus power is within a set range.

38. The program of claim 20, wherein the program further comprises instructions for detecting a peak focus power between the bottom surface of the coverslip and the top surface of the substrate.

* * * * *